US010263873B2

(12) United States Patent
Toomey et al.

(10) Patent No.: US 10,263,873 B2
(45) Date of Patent: Apr. 16, 2019

(54) METHOD AND SYSTEM FOR DETERMINING SHORT-TIMESCALE TRAFFIC RATES FROM TIME-STAMPED PACKET DATA

(71) Applicant: Corvil Limited, Dublin (IE)

(72) Inventors: Fergal Toomey, Dublin (IE); Ian Dowse, Dublin (IE)

(73) Assignee: CORVIL LIMITED, Dublin (IE)

( * ) Notice: Subject to any disclaimer, the term of this patent is extended or adjusted under 35 U.S.C. 154(b) by 199 days.

(21) Appl. No.: 15/347,701

(22) Filed: Nov. 9, 2016

(65) Prior Publication Data
US 2018/0131591 A1    May 10, 2018

(51) Int. Cl.
*H04L 12/26*      (2006.01)

(52) U.S. Cl.
CPC ............ *H04L 43/106* (2013.01); *H04L 43/04* (2013.01); *H04L 43/0894* (2013.01); *H04L 43/16* (2013.01)

(58) Field of Classification Search
CPC ... H04L 43/04; H04L 43/0894; H04L 43/106; H04L 43/16
See application file for complete search history.

(56) References Cited

U.S. PATENT DOCUMENTS

| | | | | |
|---|---|---|---|---|
| 6,724,736 B1* | 4/2004 | Azriel | ...................... | H04B 3/23 370/286 |
| 7,215,637 B1* | 5/2007 | Ferguson | ................ | H04L 45/00 370/230.1 |
| 7,411,758 B1* | 8/2008 | Cheung | .............. | G11B 5/59661 360/51 |
| 7,519,006 B1* | 4/2009 | Wing | ................ | H04L 29/06027 370/252 |
| 7,986,629 B1* | 7/2011 | Ferguson | ................ | H04L 49/25 370/235 |
| 2002/0105911 A1* | 8/2002 | Pruthi | ..................... | H04L 41/22 370/241 |
| 2006/0184563 A1* | 8/2006 | Potter | ............... | G06F 17/30548 |
| 2007/0274227 A1* | 11/2007 | Rauscher | ............ | H04L 43/0858 370/252 |
| 2009/0116397 A1* | 5/2009 | Denby | .................. | H04L 41/145 370/252 |
| 2009/0296583 A1* | 12/2009 | Dolezilek | ............. | H04L 43/026 370/241 |
| 2015/0163154 A1* | 6/2015 | Chaloupka | ............ | H04L 47/283 370/503 |
| 2016/0085942 A1* | 3/2016 | Vann | ....................... | G16H 15/00 715/772 |

* cited by examiner

*Primary Examiner* — Edan Orgad
*Assistant Examiner* — Nourali Mansoury
(74) *Attorney, Agent, or Firm* — Schwabe Williamson & Wyatt, PC (57) ABSTRACT

A method and system for determining short-timescale traffic rates from time stamped packet data is described. The method and system provides for the calculation of traffic rates, or bandwidths, in bits-per-second or packets-per-second over short time windows, using time-stamped packet records as input.

24 Claims, 9 Drawing Sheets

METHOD AND SYSTEM FOR DETERMINING SHORT-TIMESCALE TRAFFIC RATES FROM TIME-STAMPED PACKET DATA

FIELD OF THE INVENTION

The invention relates to packet-based data communication networks. More particularly it relates to the calculation of traffic rates, or bandwidths, in bits-per-second or packets-per-second over short time windows, using time-stamped packet records as input.

BACKGROUND

A packet-based data communications network is a collection of network elements interconnected to support the transfer of information from one element to another, and having the characteristic that data is transferred in discrete chunks or packets, where all the information in each packet has a common source element and a common destination element.

Figure 1:
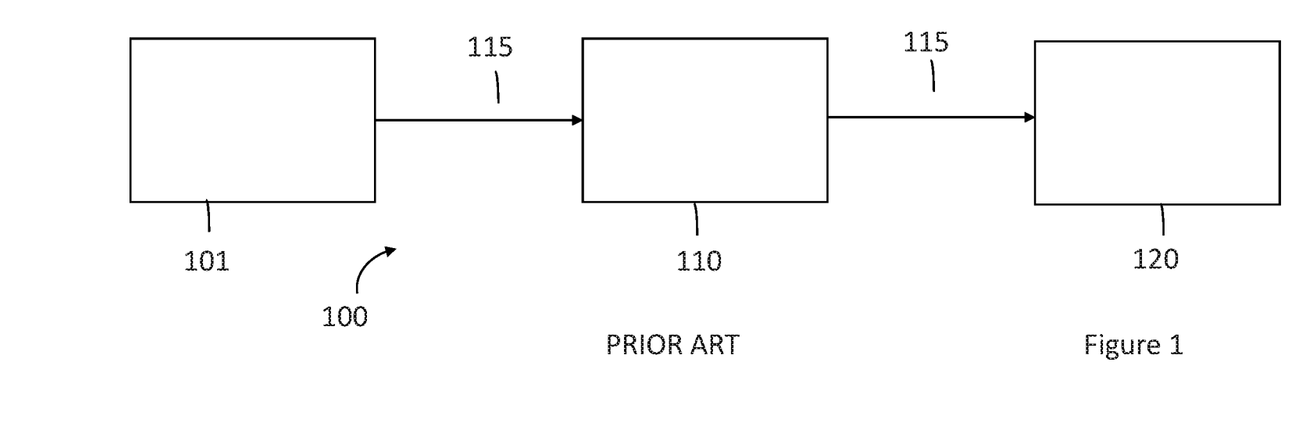
FIG. 1 is a schematic of a known packet based network.

FIG. 1 shows in schematic form basic elements of such a network. The principal network elements are a source element 101, links 115, a switch 110 and an endpoint 120. In this schematic the traffic is indicated as travelling on one direction only but it will be understood that each basic element may facilitate multidirectional traffic and that a source element for one data path may serve as an end point for another data path. It will be understood that a network will comprises a plurality of such basic elements which define a data communication path within which traffic may be routed. A link 115 transfers packets of data from one switch 110 or endpoint 101, 120 to another. Each packet is transmitted into a link as a stream of bits, typically at a constant rate measured in bits-per-second. At the other end of the link the same data is received as a stream of bits at the same constant rate and the original packet is reconstructed. Only one packet is transmitted or received at a time in each direction, although links 115 are typically bi-directional and can simultaneously transfer data in different directions. A switch 110 is connected to multiple links; as it receives packets of data from these links 115, it determines a set of links where each packet should be forwarded and transmits the packet on these links. An endpoint 101, 120 is a system connected to one or more links that acts as an origin of packets for transmission into the network, or as a destination for packets received from the network.

It is well understood that packets contain variable amounts of information. This amount of information in a packet is typically referred to as the packet's size or volume, measured in bits. A packet's volume may change as it is transferred from element to element within a network. A switch may break a packet up into two or more new packets (having the same origin and destination endpoints as the original packet). A switch may also assemble two or more packets that have the same origin and destination endpoints into a single packet.

It is well discussed in the art that the actual speed achieved in a packet based network is an important design parameter and performance characteristic of the network. While network designers and providers can quote the bandwidth capacity of their network, it is important to be able to independently test or audit those parameters.

Accurate knowledge of short timescale traffic rates in communications networks is useful for ensuring that critical systems and network links have sufficient capacity to process and/or forward data without introducing delays. Traffic in such networks is typically 'bursty', meaning that elements originate and transmit data in short bursts of high activity interspersed with periods of lower activity. To avoid processing delays during these bursts, resources must have sufficient capacity to keep up with the higher activity level that they represent. If the transmission rate of a traffic source is measured over a timescale that is long compared with its typical burst duration, then the measurement will represent an average over periods of both high and low activity. As such it does not provide a useful indication of the resource capacity needed to keep up with the traffic rate during bursts.

There is therefore a need to provide an accurate method to measure the peak or maximum rate at which a traffic source is sending data in a packet-based data communications network, based on observations of packets received from that source at a downstream point in the network.

SUMMARY

These and other needs are addressed in accordance with the present teaching by a system and method that measure the peak or maximum rate at which a traffic source is sending data in a packet-based data communications network, based on observations of packets received from that source at a downstream point in the network. The term 'traffic source' within the context of the present teaching refers to either an endpoint element of to the network that acts as the origin of the packets in question, or to a switch that is receiving the packets from elsewhere and transmitting them to further elements in the network.

In accordance with the present teaching a method of analysing packet traffic within a data communication network comprises:

a. identifying a plurality of time stamped packet records originating from a source within the data communication network, at least a first time stamped packet record being within a first time period having a first duration and a second time stamped packet record being within a second different time period having a second duration;

b. within each of the first time period and the second time period computing a volume of data carried by the plurality of time stamped packet records defined wholly within that time period;

c. computing a lower bound on the source transmission rate by evaluating a ratio of the volume of data within a time duration defined for each of the first time period and the second time period and a defining a peak transmission rate as the greater of the first ratio and the second ratio.

By identifying a plurality of time stamped packet records, the present teaching provides for a definition of a series of time stamped packet records. Each of the first time period and the second time period will include at least one time stamped packet record but will also typically include additional time stamped packet records of a sequential series. These time-stamped packet records are used as an input to the computer implemented method as each records contain the size or volume of each packet observed, along with timestamps indicating when each packet was observed at a network location.

In a modification to this arrangement, a plurality of packets can be grouped into blocks so as to reduce the number of memory locations that need to be used in analysing the packet traffic.

These and other features will be better understood with reference to the following figures.

DETAILED DESCRIPTION OF THE DRAWINGS

Figure 2:
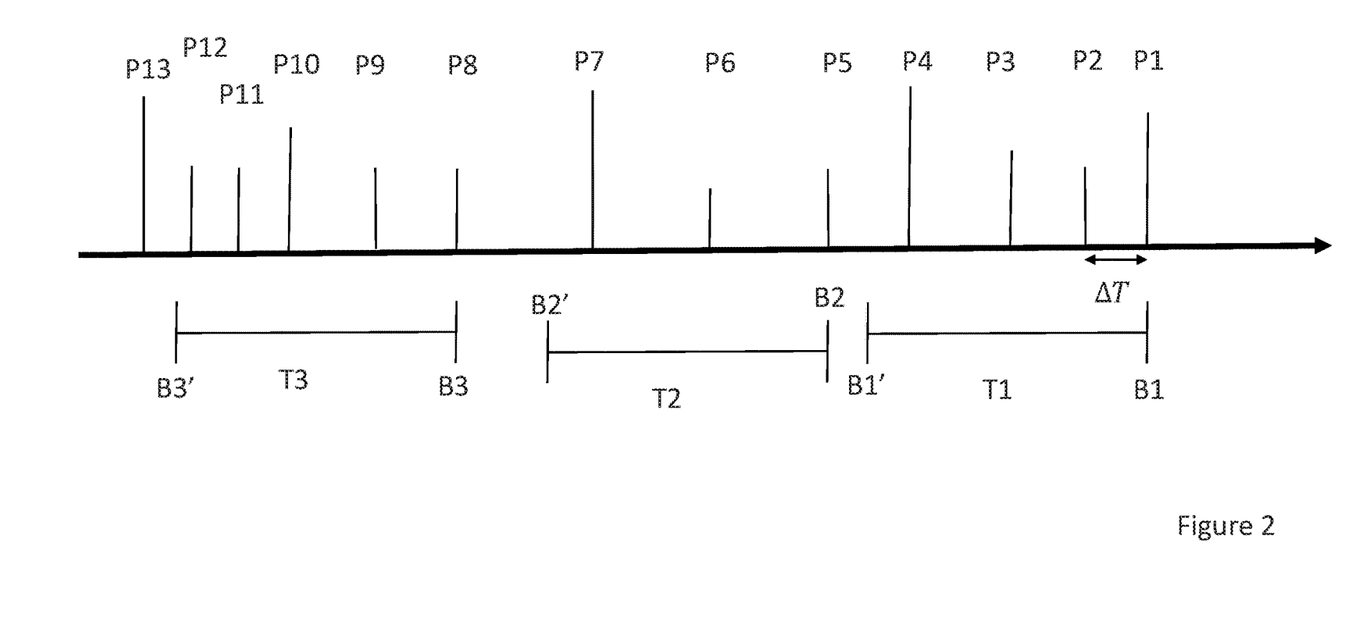
FIG. 2 is a schematic showing a series of individual packets traversing a network with the identification of first, second and third time periods.

FIG. 2 shows an example of a series of packets P1 ... P13 as identified at a measurement point within packet data network. This identification can be achieved using a network management tool in a variety of different ways and facilitates a definition of a series or a plurality of series of time stamped packet records. The management tool includes an interface element that is configured to interface with the packet data network and extract information from the packets traversing network. The present method defines at least a first time period T1 and a second time period T2; FIG. 2 shows in addition a third time period T3. Within at least the first time period T1 and the second time period T2, the present teaching identifies at least one time stamped packet record but will also typically include additional time stamped packet records of a sequential series. For example, as shown in FIG. 2, T1 comprises packets P1 ... P4, T2 comprises packets P5 ... P7 and T3 comprises packets P8 ... P12. Given the typical burstiness of packet traffic it will be appreciated that the number and size (as identified in FIG. 2 as the height of each line P1 ... P13) varies. For three time periods T1, T2, T3 of equal duration, it is not unusual to find a different number of packets and/or different packets of different size.

In accordance with the present teaching these time-stamped packet records are used as an input to a computer implemented method as each records contain the size or volume of each packet observed, along with timestamps indicating when each packet was observed at a network location. Such records can be obtained by the network management tool in several different ways, including for example:

By using a network tap that creates copies of the packets traversing a network link, and forwards these copies to a measurement system equipped with a clock from which a timestamp is read for each packet as it arrives.

By using a network element such as a switch or router to create copies of the packets that arrive or are transmitted on selected links, and to send these copies to the measurement system. This capability, known as port-mirroring or Switch Port Analyzer, is available on many commercial switch models. Some models can also read a timestamp from a clock when the packet copy is created, and can forward this timestamp along with the copy to an external measurement system. Alternatively, a measurement system equipped with a clock can generates its own timestamp for each packet when it is received.

By using a packet-capture utility, such as libpcap or winpcap, installed on a network endpoint, to create copies of packets as they are received or transmitted at the endpoint. These utilities read a timestamp for each packet from the endpoint system clock as the packet is received or transmitted and store the timestamp along with the packet copy. The stored time-stamped packet data can then be transferred to a measurement system for analysis, or the analysis software can be deployed on the endpoint itself to access the data locally.

The network interface element can be located at or in communication with an end point or an intermediary node within the data path. The network interface element could for example be located at either of the end points 101, 120 in FIG. 1 or could be co-located with a switch or router 110. It will be appreciated that what is important is that the network interface element can provide the network analysis tool with details of the packets traversing the network. The processing of these packets will typically require a processing unit, a computer-readable storage medium (for example, ROM or flash memory), a communication subsystem, an interface, and an I/O interface. The processing unit can include one or more processing components (alternatively referred to as "processors" or "central processing units" (CPUs)) configured to execute instructions related to one or more of the processes, steps, or actions described below in connection with one or more of the implementations disclosed herein. The processing unit can also include other auxiliary components, such as random access memory (RAM) and read only memory (ROM). The computer-readable storage medium can be embodied by a non-transitory medium configured to store an operating system (OS) and various other computer-executable software programs for performing one or more of the processes, steps, or actions described herein.

Using time-stamped packet records, a simple method of measuring the rate of traffic from a given source over an interval of duration T is to identify the packets from that source whose timestamps fall in the interval, and divide the total volume (measured in bits, packets, or messages) contained in these packets by T. For large values of T this method will provide a reasonable estimate of the average data rate of the source. In the example of FIG. 2, this would equate to using packets P1 ... P4 for T1, packets P5 ... P7 for time period T2 and packets P8 ... P12 for time period T3. However the present inventors have realised that for small values of T, comparable with the inter-packet time in the source traffic such a methodology does not provide useful results.

For example, suppose that the source is transmitting packets of size 10,000 bits into the network at a constant bit-rate of 10 megabits per second (Mbps), so that one packet is transmitted every millisecond. If the value of T is 1 second, then each interval of duration T will contain either 999 or 1000 packet timestamps (depending on the alignment of the interval with the evenly spaced sequence of timestamps). This gives bit-rate estimates of either 9.99 or 10 Mbps, i.e. close to the actual transmission rate of the source. However, if T is 1.5 milliseconds then each interval of duration T will contain either one or two packet timestamps, giving results of 6.66 Mbps or 13.33 Mbps. As the measurement interval approaches the inter-packet time, the result of measurement diverges increasingly from the actual source transmission rate. When the measurement interval is shorter than the inter-packet time then each measurement will either be zero (if the interval contains no packet timestamps), or equal to the packet volume divided by the length of the interval (if the interval contains one packet timestamp). Neither of these values is related to the transmission rate of the traffic source. If measured rates are taken over multiple intervals of length T and then maximized to determine the peak transmission rate of the source, the result will in general be too large.

To address this possible error, the present inventors have realised that while the timestamps in time-stamped packet records tell us when each packet arrived at the location of the time-stamping unit, they do not tell us how long each packet took to transmit. The timestamps are best thought of as constraints on the volume of data that we can infer to have been sent during any interval. To apply this reasoning, we shall make the following assumptions throughout the following description:

The packets are transmitted by the source in the same order as they are received at the timestamping unit, i.e. they are not reordered during transport across the network, i.e. Packet P1 was transmitted before P2 before P3 etc.

The packets experience negligible jitter during network transport, i.e. the differences between successive packet timestamps are the same at the time-stamping unit as they are at the data source.

Packets retain the same size as they are transferred across the network, and the number of packets does not change; i.e. the volume of data in Packet P1 at the source is the same as the volume of data in Packet P1 at the measurement point.

Under these assumptions, we can infer that all the volume in each packet must have been transmitted from the source over an interval of duration no greater than the difference between the packet's timestamp and the timestamp of the preceding packet, i.e. that the volume in packet P1 must have been transmitted in a time equivalent to $\Delta T$.

More generally, during any interval of time, of duration say T, the volume of data contained in all packets with timestamps in that interval except the last one must have been transmitted over an interval of length no greater than T. It will be appreciated in this context that the terms "first" and "last" are relative terms and relate to periods in time. Within the present disclosure, the term "first" will be used to reference the packet which as the latest time stamp, i.e. most recently received at the measurement point. The term "last" will be used to describe a record received prior to the nominated first record, i.e. a packet that has an earlier time stamp.

To identify which packet should be excluded, the present teaching defines for each of the time periods a first boundary B1, B2, B3 that is coincident with a time stamp of a time stamped packet record P1, P5, P8. A second boundary B1', B2', B3' of each of the time periods T, T2, T3 is defined by the duration of each of the time periods.

Within each of these bounded time periods, the time stamped packet record whose time stamp defines the first boundary of the respective time period is a first time stamped packet record defined wholly within that time period. The identification of other stamped packet records within each identified time period can then be identified from the extent of the respective time period and its boundaries. In the example of FIG. 2 this facilitates defining within T1 a series of time stamped packet records P1 ... P4; within the time period T2 a series of time stamped packet records P5 ... P7; and within the time period T3 a series of time stamped packet records P8 ... P12.

To identify the volume of data carried by the plurality of time stamped packet records defined wholly within a respective time period the present teaching analyses the series of time stamped packet records within each time period, identifying a last time stamped packet record within the series and disregards any data carried by that identified last time stamped packet record when computing a sum of data carried by the series of time stamped packet records. In the example of FIG. 2, this requires exclusion of packet P4 from the measurement within interval T1, packet P7 from the measurement within interval T2 and packet P12 from the measurement within interval T3. These packets are excluded because there is no guarantee that all its data was transmitted during the interval in question. If the total volume of these packets is V then this gives a lower bound on the source transmission rate, of V/T.

The time-stamped packet records therefore provide lower bounds or constraints on the rate at which the data source transmits data. For any given timescale T, we can determine a lowest possible peak transmission rate P(T) that is consistent with the constraints for all time intervals of duration T or longer, as follows. For an interval of time beginning at time t=A (inclusive) and ending at time t=B (inclusive), let V(A, B) be the total volume of the packets with timestamps in the interval excluding the last such packet. We define P(T) to be the supremum of V(A, B)/(B−A) over all intervals [A, B] for which packet records are available satisfying B−A≥T:

$$P(T) := \sup\nolimits_{A,B:B-A\geq T} \frac{V(A, B)}{B - A}.$$

The quantity P(T) has the following characteristics:

For large values of T it approaches the average data rate of the traffic source;

For traffic sources that send data in bursts, the value of P(T) is close to the peak data rate within bursts when T is shorter than the burst duration;

For traffic sources that have a well-defined peak data transmission rate, for example because they transmit data into the network over a link of constant bit-rate, P(T) never exceeds this rate for any value of T.

For example, consider the case of a traffic source which sends bursts of packets at a constant rate of 10 Mbps, interspersed with periods of inactivity, where each burst contains at least 2 packets. The value of V(A, B)/(B−A) does not exceed 10 Mbps for any interval [A, B], therefore neither does the value of P(T) for any T. However, P(T) attains the value 10 Mbps when T is short compared with the duration of a burst. If each burst contains just 2 equal-sized packets, P(T) will be equal to 10 Mbps when T is shorter than the time taken to transmit each packet at the rate of 10 Mbps.

Given these characteristics, P(T) provides a useful set of metrics for investigating the peak transmission rate of a data source over a range of timescales, capable of revealing the behaviour of bursty traffic sources at short timescales while avoiding misleading results.

Returning to the example of FIG. 2, in order to measure the value of P(T) for a given sequence of time-stamped packet records, it is noted that when evaluating the supremum over A and B in the definition of P(T), we can restrict the value of B to be a packet timestamp. This is true because for any interval [A, B] where V(A, B) is not zero and B is not a packet timestamp, we can form a new interval [A', B'] by shifting both A and B backwards in time by equal amounts, such that B' coincides with the timestamp of the first packet in the interval [A, B]. The new interval has the same duration as [A, B] and contains all the packets in [A, B]. Therefore V(A', B')/(B'−A') is at least as large as V(A, B)/(B−A) so that [A, B] can be omitted from the supremum.

We can also restrict the choice of A in the supremum to either equal a packet timestamp, or to be equal to B−T. To demonstrate this, take any interval [A, B] where V(A, B) is not zero and where A is not a packet timestamp. Let A' be the time of the last packet in this interval. Then [A',B] is shorter than [A, B] and contains the same packets, so that V(A', B)/(B−A') is at least as large as V(A, B)/(B−A). If B−A' is greater than or equal to T we can therefore omit the choice [A, B] from the supremum in favour of [A', B]; otherwise, we can omit it in favour of [B−T,B].

Let $T_k$ be the timestamp of packet k, where the packets are numbered in their order of arrival at the time-stamping unit. We can re-write the formula for P(T) as follows:

$$P(T) = \sup_k \left\{ \frac{V(T_k - T, T_k)}{T}, \sup_{l: T_k - T_l \geq T} \frac{V(T_l, T_k)}{T_k - T_l} \right\}.$$

For $1 \leq m < k$, $V(T_l, T_k) = V(T_l, T_m) + V(T_m, T_k)$ so that $V(T_l, T_k)/(T_k - T_l)$ is a convex combination of $V(T_l, T_m)/(T_m - T_l)$ and $V(T_m, T_k)/(T_k - T_m)$. Its value is therefore no larger than the largest of these two terms. It follows that the supremum over l in the formula for P(T) can be further restricted. For a given value of k let M(k) be the largest (i.e. first) packet record index m for which $T_k - T_m \geq T$. Furthermore, let L(k) be the largest index l for which $T_{M(k)} - T_l \geq T$. In the supremum, for any value of l that is less than or equal to L(k) we can write the rate $V(T_l, T_k)/(T_k - T_l)$ as a convex combination of $V(T_l, T_{M(k)})/(T_{M(k)} - T_l)$ and $V(T_k, T_{M(k)})/(T_k - T_{M(k)})$, which shows that it cannot be larger than both of them. Therefore, we need only consider values of l for which l>L(k) when evaluating the supremum for packet record k.

Figure 6:
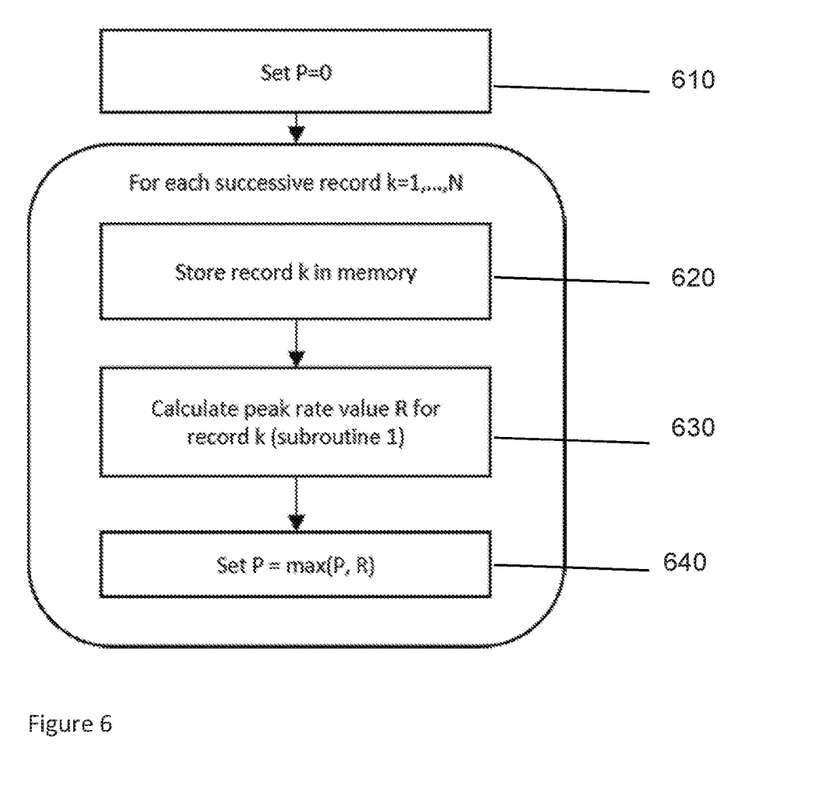
FIG. 6 is an example of a computer implemented flow diagram that can be used to calculate a peak rate value over a sequence of time-stamped packet records 1, ..., N (numbered in order of increasing timestamps) to generate blocks of data such as those shown in FIG. 5.
Figure 7:
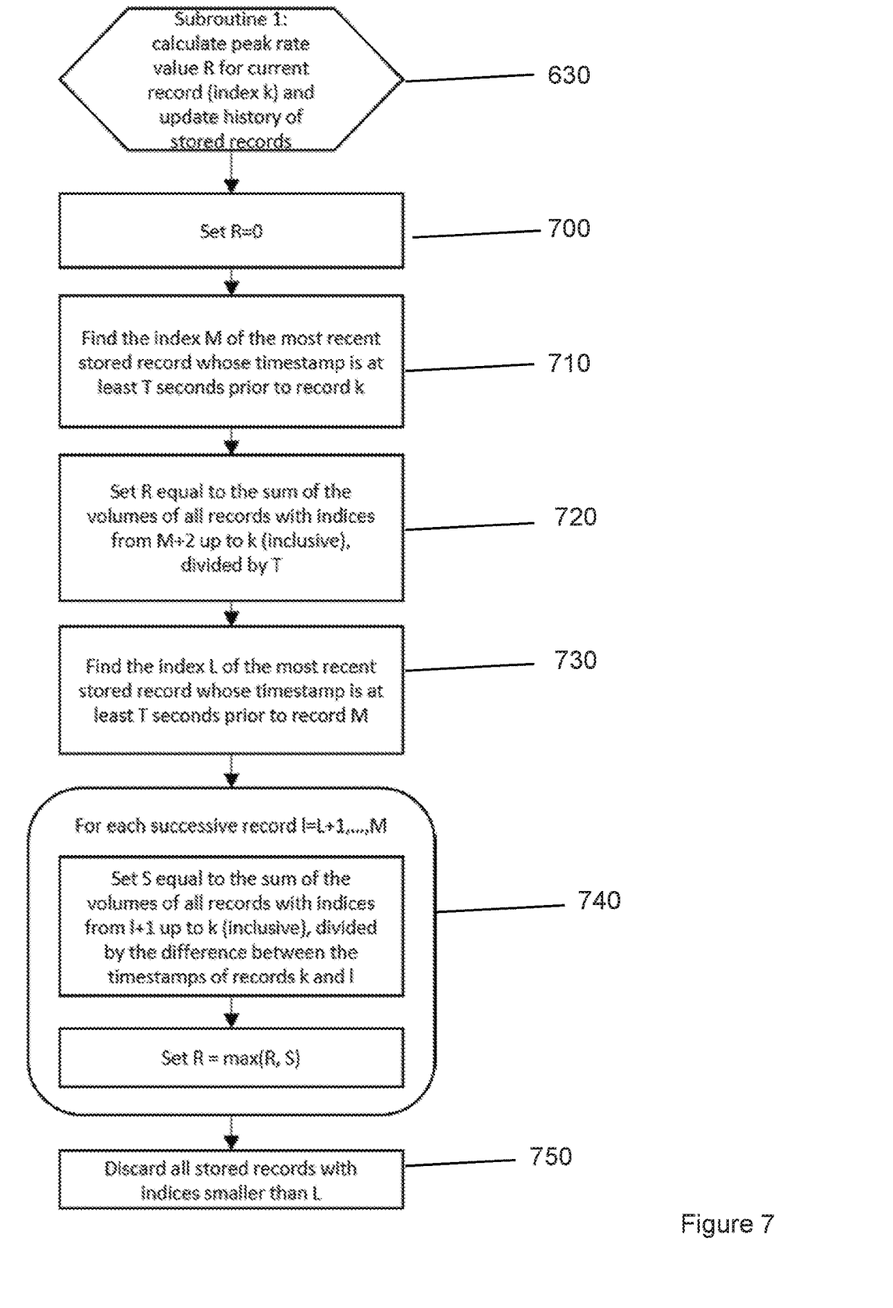
FIG. 7 is a flow diagram for calculating a peak rate value associated with the kth timestamped volume record in a sequence, using the kth record and a history of previously stored records.

Based on these observations, we now describe with reference to FIGS. 6 to 10 a method for calculating the value of the quantity P(T). We assume that we are given as input a sequence of N volume records $\{V_k: k=1, \ldots N\}$ and corresponding timestamps $\{T_k: k=1, \ldots, N\}$, ordered so that $T_1 < T_2 < \ldots < T_N$. For example, $V_k$ and $T_k$ can represent respectively the volume and timestamp of packet k in a sequence of N successive time-stamped packet records. If our aim is to determine a peak bit-rate value, then we take $V_k$ to be the volume of packet k in bits. If our aim is to determine a peak packet-rate, then we take $V_k = 1$ for each k. The method processes the records in timestamp order and calculates a rate value P representing the quantity P(T) by carrying out the following steps which are detailed in FIGS. 6 and 7:

1. Initialize P by setting P=0 (Step 610)
2. For each time-stamped volume record k=1, . . . , N carry out the following steps 3-9.
3. Store the timestamp record $T_k$ and volume record $V_k$ in memory of a computing device associated with the measurement system (Step 620).
4. Initialize a rate value R associated with record k by setting R=0 (Step 630, FIG. 7)
5. Find the index M of the most recent stored record whose timestamp is no less than T seconds prior to the timestamp of record k. If there is no such record, set M=0. (Step 710)
6. Set R equal to the sum of the volumes of all records from index M+2 up to k (inclusive), divided by T. (If M is equal to k or k−1 then R remains equal to zero). (Step 720)
7. Find the index L of the most recent stored record whose timestamp is no less than T seconds prior to the timestamp of record M. If there is no such record, then set L=0. (Step 730)
8. For each index l satisfying l>L and l≤M, calculate a rate value S equal to the sum of the volumes of all records with indices from l+1 up to k (inclusive), divided by the difference between the timestamps of records k and l; if S is greater than R then set R equal to S. (Step 740)
9. If L is not zero, discard all timestamp and volume records prior to record L. (Step 750)
10. If R is greater than P then set P equal to R. (Step 640)

As a variation on the above algorithm, at step 8 when calculating values of S for indices l satisfying l>L and l≤M and using these values to update the value of R, we can choose instead to execute this step for just a subset of these indices. Doing this improves computational performance by reducing the number of terms to be evaluated, while still providing a useful lower bound on the value of R and hence P. In practice, for many traffic patterns the value of S which corresponds to $V(T_l, T_k)/(T_k - T_l)$ typically decreases as $T_k - T_l$ increases, so that useful estimates of P may be obtained even when only the term for l=M (for which $T_k - T_l$ is smallest) is included in step 8.

Figure 3:
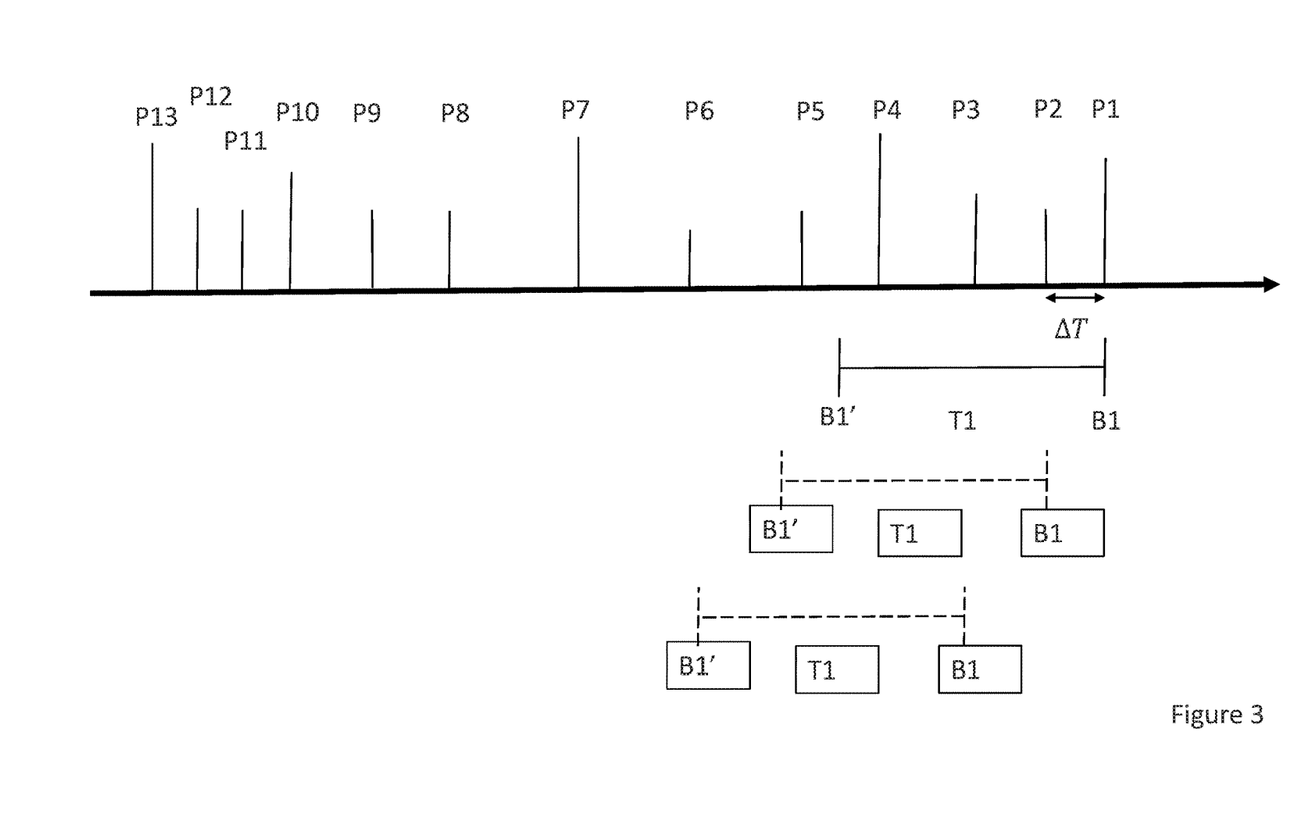
FIG. 3 is a schematic showing how the location of the first time period can be moved to co-locate its first boundary with each of the packets in the series.

It will be appreciated that the process described is an iterative process. FIG. 3 shows how the first boundary may be moved to another time stamped packet record so as to be coincident with the time of that time stamped packet record—in the example of FIG. 3 the boundary B1 is moved in two scenarios so as to be coincident with teach of P2 and P3. In each instance, the new first time period (and equivalently although not shown the new second time period) has a different subset of the plurality of time stamped packet records. In this way multiple time intervals may be generated, each time intervals having the same length but having a first boundary that is different to the others of the multiple time intervals.

Figure 4:
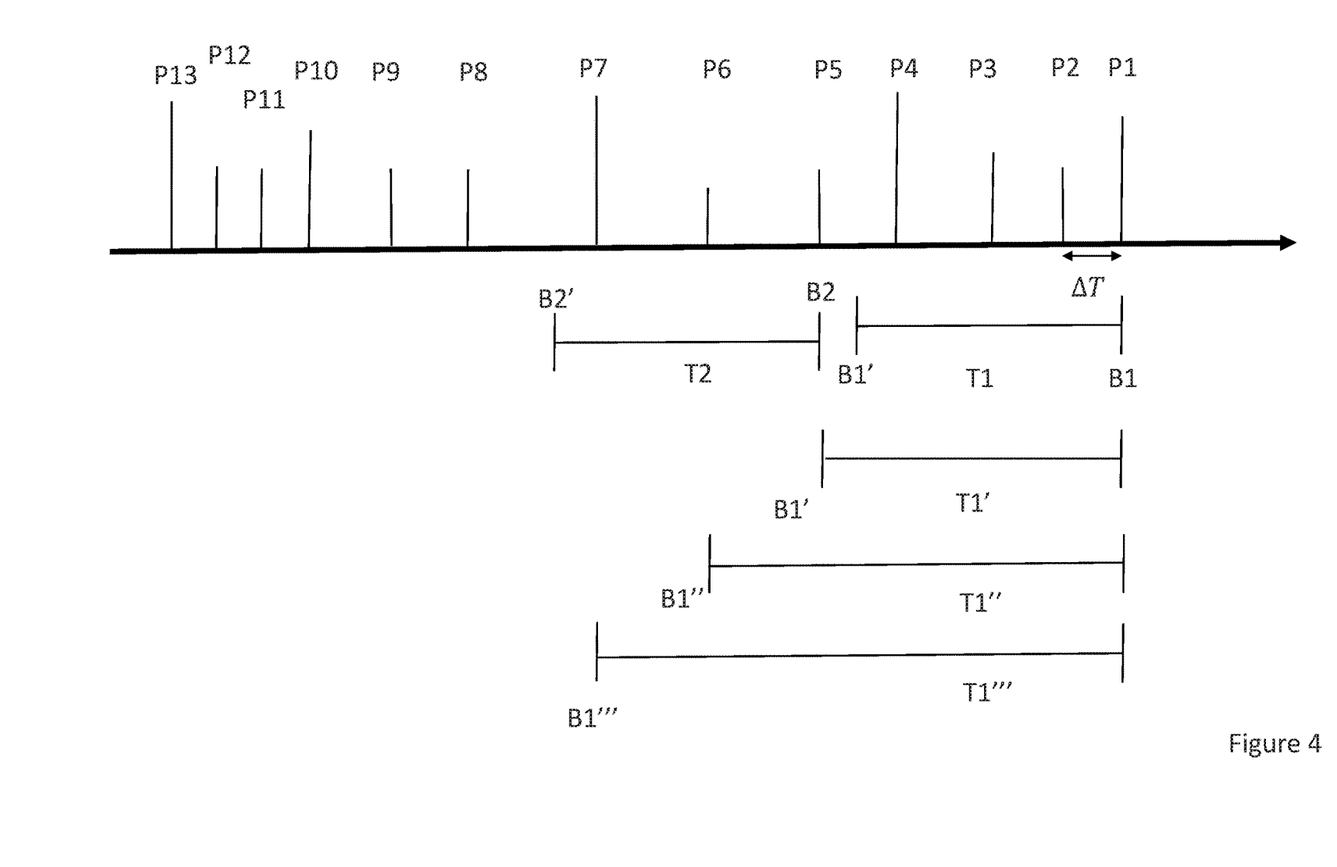
FIG. 4 is a schematic showing how multiple time periods can be used where each share a common first boundary and the duration of each time period is at least the duration of the first time period.

FIG. 4 shows a further modification which makes use of multiple time intervals where for each packet timestamp, at least one interval is provided whose first boundary is that packet timestamp and whose second boundary is another packet timestamp, and whose length is at least T. In the example of FIG. 4, multiple additional time periods T', T", T''' are defined, each having a first boundary B1 that is coincident with packet P1 and whose second boundaries B1″, B1′, B1‴ are co-located with the time stamp of a time stamped packet record that is located within the second time period T2. Where multiple time periods are used in this fashion, the maximum ratio of the volume of data per the aggregate of the data from each time stamped packet record within that time period for each of the time periods is then used to define the received data rate.

The method described above calculates P(T) from individual time-stamped packet records, by traversing the records from earliest to latest while storing a history of recently-processed records in memory. To update the value of the quantity R for the $k^{th}$ record at step 8, the algorithm requires access to stored timestamps and volumes for all records from index L up to index M, where L and M are the largest indices satisfying $T_k-T_M \geq T$ and $T_M-T_L \geq T$. Thus, the amount of storage required is proportional to the number of packets that may be sent by the source during intervals of duration T. Since modern data sources can send many millions of packets per second, the amount of storage required by the above method can be large even if T is small. For this reason, we also present the following method of calculation which computes accurate estimates for P(T) while using only a fixed amount of storage space that does not depend on the rate at which the source sends packets.

Figure 5:
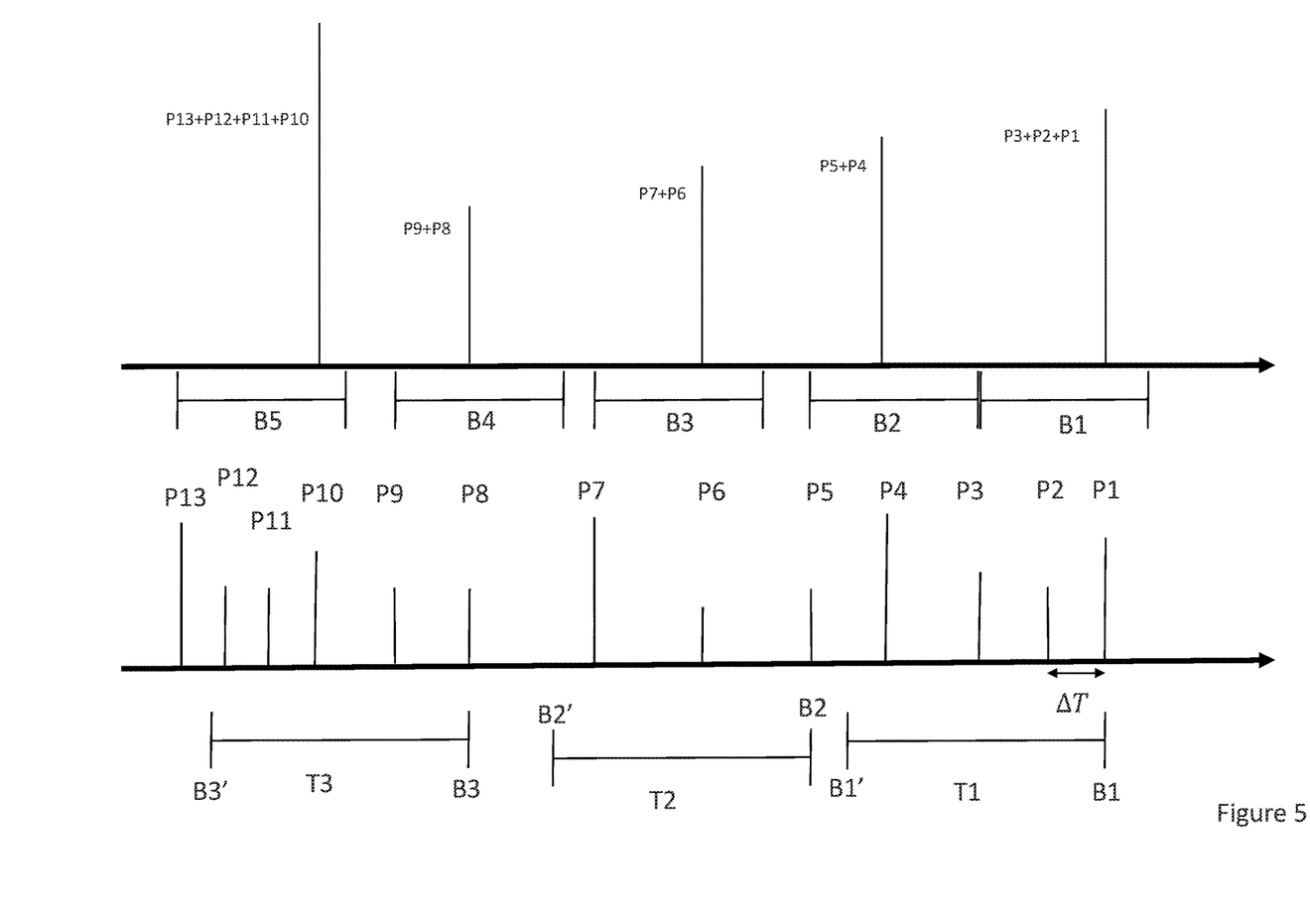
FIG. 5 is a schematic showing how the packet series of FIG. 2 can be aggregated into a smaller set of blocks of data.

Such a method which is exemplified with reference to FIG. 5 which shows the result of aggregating data from multiple successive packets into single records, called block records which can then be stored in a fixed storage space. Using such an aggregation technique, the present teaching facilitates a reduction in the actual storage required for analysis purposes. The example of FIG. 5 shows the effect of data aggregation or block formation on the packet sequence shown in FIG. 2, for the ease of reference the specifics of FIG. 2 are replicated below the new data representation showing the blocks that result from consolidation of the data volume from a plurality of packets into one block value, that is then stored in memory. The time stamp of this block is set as the time stamp of the oldest packet within the block period.

The number of packets that are aggregated into each block depends on the arrival times of the packets and the length of the block. To ensure that there is an appreciable benefit in using the blocks representing a plurality of packets as opposed to analysing each packet, the duration of the block is greater than the expected interval between each packet but typically less than the actual analysis time T that defines the granularity of the measurement value. Typically, the user will define the actual granularity T and the duration of B is determined relative to that value. It will be appreciated that the longer the value of B, the more packets can be expected to be aggregated within any one block. This will require less memory for the entire series but will reduce the accuracy of the measurement. The present inventors have realised that a reasonable trade-off value is to define B as having a value that will be within about a 1% error of the value of T. It will be appreciated that having made this determination that the reduction in the number of memory cells required for the buffering of the data packets can be reduced in accordance with a parameter T/B. As the number of packets cannot be controlled, the use of B allows control of memory requirements.

As shown in FIG. 5, having chosen a value for B, the same duration block length intervals B1, B2, B3 may then be used to parse the series of data packets records. The time intervals B1, B2, B3 etc show how the packets get collected into blocks, but do not represent the block records themselves—each block record has only one timestamp. It will be appreciated that per this technique that any one packet only gets allocated to one block. B5, the first interval shown, starts at the earliest packet P13 and includes all packets up to the timestamp of P13 plus B, where B is the block size parameter. Having identified the block interval relative to P13 it is evident that P13, P12, P11 and P10 all fall in this interval, so all end up in the same block record. The timestamp of the block record is set to that of P10 (the last packet timestamp in the block. The volume of the block record is the sum of the volumes of P10-P13. The next block interval, B4, starts at P9 (the next packet after the previous block) and ends at the timestamp of P9+B. The timestamp for this block is that associated with P8 from FIG. 2. This process is repeated for multiple blocks and within each block the defined packets are aggregated and then used in subsequent analysis.

As is evident from the above, each packet is placed into no more than one block. Each block record has an associated timestamp and a volume. The timestamp of a block record is equal to the highest timestamp of any packet contained in the block. The volume of a block record is the sum of the volumes of the packets it contains. In this way, the sequence of packet records $\{(T_k,V_k):k=1, \ldots, N\}$ is replaced by a smaller sequence of block records $\{(T_k^B, V_k^B): k=1, \ldots, K\}$ where $T_k^B$ is the timestamp and $V_k^B$ the volume of block record k, and the total number of block records is K≤N. As before we index the block records in order of increasing timestamps.

An estimate of P(T) from block records can be obtained by applying a method like that described above, but using block records in place of packet records. Our method traverses the packet records in timestamp order, and stores a history of completed block records as well as a current working block record. For each new packet record our method first applies a rule—called the block completion rule—to decide whether the current working block record is now complete or not. If it is completed, we store it in the history of completed blocks, and start a new working block record whose volume is initially set to zero. The packet is then added to the current working block record by setting the block record timestamp equal to the packet timestamp, and adding the packet volume to the block record volume.

Once the stored history of block records and the current working block record have been updated in this way for packet record k, our method then calculates a value R for this packet record using the same steps 4-8 described above but employing the block records (both the stored completed block records and the current working block record) in place of the time-stamped packet records. After this, old block records are discarded from memory using step 9 and a maximum rate value P is updated as in step 10.

This method can be applied regardless of the choice of block completion rule used to assign packet records to blocks. If we use a rule that limits the number of blocks created per unit time then we can ensure that the memory required to store completed block records will remain constant, independent of the rate at which packets arrive. On the other hand, it is not desirable to aggregate multiple packet records into long blocks. Each block record has a single timestamp, so when multiple packets are aggregated into a single block information about their individual timestamps is inevitably lost. To maintain accuracy therefore it is desirable to limit the maximum duration of blocks that contain more than one packet.

Figure 8:
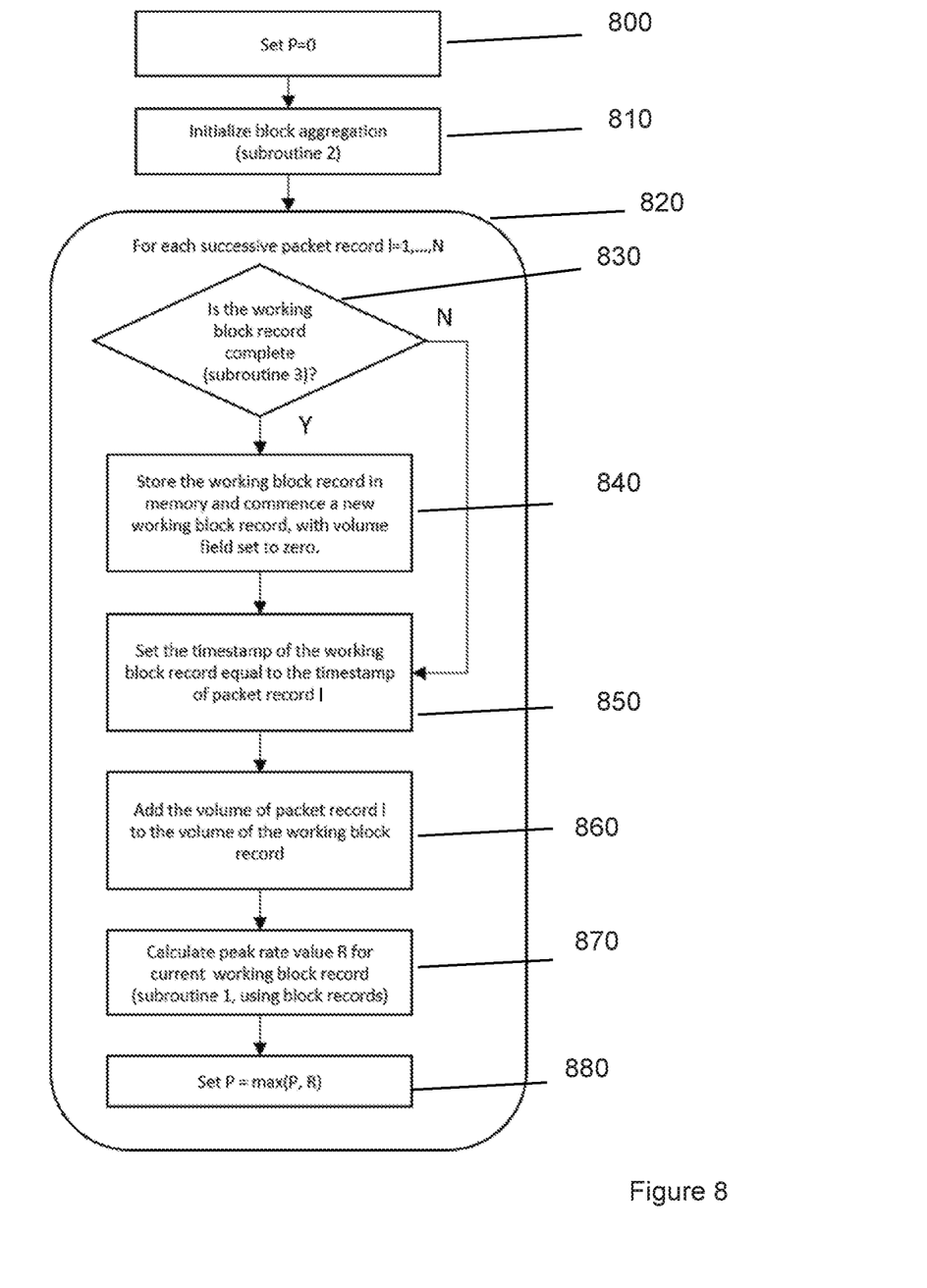
FIG. 8 is a flow diagram to compute a maximum peak rate over a sequence of time-stamped packet records, where the records are aggregated into block periods, each block period providing a record defining a single data value having a volume equivalent to a sum of all data from individual time stamped packet records within that block period.
Figures 9, 10:
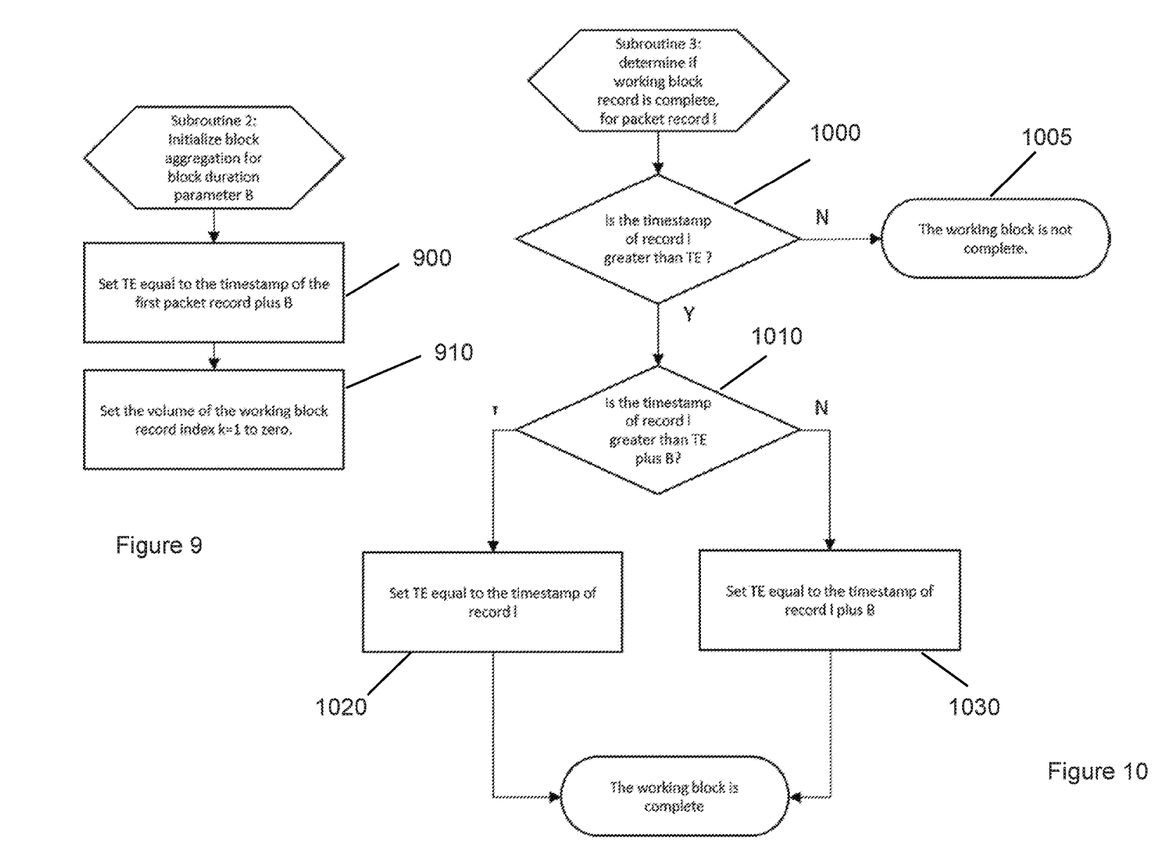
FIG. 9 is a flow diagram of a sub-routine used within the flow sequence of FIG. 8 to initialize and update a module that aggregates time-stamped packet records into block records.
FIG. 10 is a flow diagram of another sub-routine used within the flow sequence of FIG. 8 to initialize and update a module that aggregates time-stamped packet records into block records.

We now describe with reference to FIGS. 8, 9 and 10, an example of an appropriate methodology for assigning packet records to blocks that balances these trade-offs. We define a target block duration B in seconds. This parameter controls the maximum duration of blocks and the rate at which blocks are created per unit time. To ensure accurate results it is appropriate to set B equal to a small fraction of the measurement interval T. The method processes the packet records in timestamp order, and maintains at all times a stored value $T_E$ representing a time limit beyond which the current working block will be deemed to be complete. Initially, the block aggregation routine is initialised by setting the working parameter P=0 (Step 800) and initialising the block aggregation routine, Step 810—the subroutine process of FIG. 9. $T_E$ is set equal to the timestamp of the last packet record plus B (FIG. 9 Step 900). The volume of the working block record index k=1 is set to zero (Step 910).

Having initialised the routine which is executing in software, for each successive packet record l=1, . . . , N, the process of Block 820 is effected. To determine if the working block record is complete for each packet record l, the sub-routine process of FIG. 10 is implemented (FIG. 8 Step 830). The time stamp of the current record l is first compared to that of TE (Step 1000).

If the timestamp of packet record l is less than or equal to $T_E$ then the current working block is deemed not complete (Step 1005);

Otherwise (Step 1010), if the timestamp of packet record l is less than or equal to $T_E$+B then we set $T_E$ equal to the timestamp of packet record l and deem the current working block record to be complete (Step 1030);

Otherwise, in the case where the timestamp of packet l is greater than $T_E$+B, we set $T_E$ equal to the timestamp of packet record l and deem the current working block record to be complete (Step 1020).

It will be noted that if step 1005 is reached and the current working block is deemed not yet complete, then packet record l will be added to the current working block. Otherwise packet record l will be added to the new working block that is created after the current working block is stored in memory.

It will be further appreciated that the subroutine of FIG. 10 ensures that $T_E$ is always equal to either the timestamp of the first packet record in the current working block, or to that timestamp plus B. If step 1030 is reached and $T_E$ is updated to equal the timestamp of packet l plus B, then the newly created block will itself be deemed complete when we process a packet record whose timestamp is later than B seconds after packet record l. Therefore the duration of the newly created block (that is, the difference between its timestamp and the timestamp of the block that precedes it), will be no smaller than B seconds and no larger than 3B seconds.

On the other hand, if step 1030 is reached and $T_E$ is updated to equal the timestamp of packet l, then the newly created block will be deemed complete as soon as the next packet record after record l is processed. Therefore, the newly created block will contain only one packet record. This the procedure ensures that blocks longer than 3B never contain more than one packet.

Having established whether an analysed packet record is to be aggregated into an existing block or to form the first packet in a new block (Step 830), the volume associated with that block is updated; Steps 840-860. This ensures that the stored volume for any one block is correctly representative of the sum of the volumes of the individual data packet records, as was used in the technique of FIGS. 6 and 7. As detailed in Step 870 the block record data can be used in calculation of the peak rate value R for the working block records using the routine of FIG. 7 and having computed a plurality of peak rate values, the peak transmission rate P is set as the maximum of the computed peak value rates for a plurality of blocks.

In this way, the use of blocks to aggregate the data from a plurality of packets allows the present teaching to reduce the number of distinct memory locations that are required for the processing of peak rate values yet still provides a methodology to facilitate generation of a peak transmission rate for the data traffic. The accuracy of the output from a block approach to a more granular per packet approach can be determined by a relative sizing of the block durations to the desired accuracy level for the peak transmission rate. For example if one was to require micro second granularity in the analysis a block duration should be of the order of 10 nanoseconds to achieve accuracy of approximately 1%.

It will be appreciated that the heretofore described methodology advantageously provides for a real-time update on the traffic as it is passing through the network as opposed to traditional approaches which have tended to rely on statistical modelling of the traffic and subsequently may be unresponsive to changes in the traffic.

As will be apparent to the person skilled in the art, the present teaching provides an analysis of the network traffic based on measurements of the traffic and calculations based on those measurements. The tools and methodology necessary to provide this analysis may be implemented in hardware and/or software configurations. For example, the provision of the counters necessary to provide for the counting of the volume and/or packets being routed through the schedulers may be provided in analog or digital electronics or for example as a software module adapted to cooperate with one or more microprocessors.

The words comprises/comprising when used in this specification are to specify the presence of stated features, integers, operations or components but does not preclude the presence or addition of one or more other features, integers, operations, components or groups thereof.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation described above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

The invention claimed is:

1. A computer implemented method of analysing packet traffic within a data communication network, the method comprising:
   identifying a plurality of time stamped packet records originating from a data source having a source transmission rate, within the data communication network, the plurality of time stamped packet records being ordered according to the order in which the packet traffic is transmitted by the data source;
   at least a first time stamped packet record being within a first time period having a first duration and a second time stamped packet record being within a second different time period having a second duration and differences between successive packet timestamps being the same as they were at the data source;
   within each of the first time period and the second time period computing a volume of data carried by the plurality of time stamped packet records defined wholly within that time period the volume of data carried by the plurality of time stamped packet records being identical to the volume of corresponding data originating from the data source;
   computing a lower bound on the source transmission rate by evaluating a ratio of the volume of data within a time duration defined for each of the first time period and the second time period and a defining a peak transmission rate as the greater of the first ratio and the second ratio.

2. The method of claim 1 wherein each of the first time period and the second time period are of equal duration.

3. The method of claim 1 wherein each of the first time period and the second time period are not of equal duration.

4. The method of claim 1 wherein each of the first time period and the second time period are distinct time intervals that do not overlap with one another.

5. The method of claim 1 wherein each of the first time period and the second time period overlap with one another.

6. The method of claim 1 wherein each of the first time period and the second time period have a first boundary that is coincident with a time stamp of a time stamped packet record.

7. The method of claim 1 wherein a second boundary of each of the first time period and the second time period is defined by the duration of each of the first time period and the second time period.

8. The method of claim 6 wherein the time stamped packet record whose time stamp defines a first boundary of a respective first time period and second time period is a first time stamped packet record defined wholly within that time period.

9. The method of claim 8 comprising for each time period identifying other time stamped packet records whose time stamps are within the first and second boundary, the first time stamped packet record and the other time stamped packet records defining a series of time stamped packet records within the time period.

10. The method of claim 9 wherein the volume of data carried by the plurality of time stamped packet records defined wholly within that time period is computed by analysing the series of time stamped packet records, identifying a last time stamped packet record within the series and disregarding any data carried by that identified last time stamped packet record when computing a sum of data carried by the series of time stamped packet records.

11. The method of claim 1 wherein the plurality of time stamped packet records are identified using a network tap that creates copies of packets traversing a network link.

12. The method of claim 11 comprising forwarding the created copies to a measurement system equipped with a clock from which a timestamp is read for each packet as it arrives at the measurement system.

13. The method of claim 1 wherein the plurality of time stamped packet records are identified using a switch or router, the switch or router configured to create copies of packets that arrive or are transmitted on selected links within the network and to send these copies to a measurement system.

14. The method of claim 1 wherein the plurality of time stamped packet records are identified using a packet-capture utility installed on a network endpoint and configured to create copies of packets as they are received or transmitted at the endpoint.

15. The method of claim 6 comprising defining at least one additional time period having a first boundary coincident with the first boundary of the first time period, the at least one additional time period having a second boundary that is coincident with a time stamped packet record that is outside the first time period, the duration of the at least one additional time period being greater than the duration of the first time period.

16. The method of claim 15 comprising for each of the at least one additional time periods computing a volume of data carried by the plurality of time stamped packet records defined wholly within that time period.

17. The method of claim 16 comprising evaluating the volume of data per time period and using the maximum of all evaluated volume of data per time period measurements in determination of the peak transmission rate.

18. The method of claim 6 comprising for each time stamped packet record within each of the defined first time period and second time period moving the first boundary so as to be coincident with the time of that time stamped packet record so as to define a new first time period and a new second time period, each of the new first time period and the new second time period having a different subset of the plurality of time stamped packet records.

19. The method of claim 1 further comprising defining a plurality of block periods of time and aggregating a plurality of individual time stamped packet records into each of the plurality of block periods of time such that each block period of time comprises a single data record having a volume equivalent to a sum of aggregate volumes of each individual time stamped packet record within that block and a time stamp equivalent to a time stamp of the last time stamped packet record within that block period.

20. The method of claim 19 wherein each block period has the same duration.

21. The method of claim 19 wherein the duration of each block period is determined with reference to the time duration.

22. An electronic device for analysing packet traffic within a data communication network, the electronic device comprising:
   an interface configured to identify a plurality of time stamped packet records originating from a data source having a source transmission rate within the data communication network, the plurality of time stamped packet records being ordered according to the order in which the packet traffic is transmitted by the data source; at least a first time stamped packet record being within a first time period having a first duration and a second time stamped packet record being within a second different time period having a second duration and differences between successive packet timestamps being the same as they were at the data source;

a processor configured to compute within each of the first time period and the second time period a volume of data carried by the plurality of time stamped packet records defined wholly within that time period, the volume of data carried by the plurality of time stamped packet records being identical to the volume of corresponding data originating from the data source;

the processor being further configured to compute a lower bound on the source transmission rate by evaluating a ratio of the volume of data within a time duration defined for each of the first time period and the second time period and to define a peak transmission rate as the greater of the first ratio and the second ratio.

23. A computer implemented method of analysing packet traffic within a data communication network, the method comprising:

identifying a plurality of time stamped packet records originating from a data source having a source transmission rate within the data communication network, the plurality of time stamped packet records being ordered according to the order in which the packet traffic is transmitted by the data source at least a first time stamped packet record being within a first time period having a first duration and a second time stamped packet record being within a second different time period having a second duration and differences between successive packet timestamps being the same as they were at the data source, wherein each of the first time period and the second time period have a first boundary that is coincident with a time stamp of a time stamped packet record, the time stamped packet record whose time stamp defines a first boundary of a respective first time period and second time period is a first time stamped packet record defined wholly within that time period;

the volume of data carried by the plurality of time stamped packet records being identical to the volume of corresponding data originating from the data source;

within each of the first time period and the second time period computing a volume of data carried by the plurality of time stamped packet records defined wholly within that time period;

computing a lower bound on the source transmission rate by evaluating a ratio of the volume of data within a time duration defined for each of the first time period and the second time period and a defining a peak transmission rate as the greater of the first ratio and the second ratio, wherein the evaluating of a ratio of the volume of data within a time duration defined for each of the first time period and the second time period or each time period comprises identifying other time stamped packet records whose time stamps are within the first and second boundary, the first time stamped packet record and the other time stamped packet records defining a series of time stamped packet records within the time period, the volume of data carried by the plurality of time stamped packet records defined wholly within that time period is computed by analysing the series of time stamped packet records, identifying a last time stamped packet record within the series and disregarding any data carried by that identified last time stamped packet record when computing a sum of data carried by the series of time stamped packet records.

24. An electronic device for analysing packet traffic within a data communication network, the electronic device comprising:

an interface configured to identify a plurality of time stamped packet records originating from a data source having a source transmission rate within the data communication network, the plurality of time stamped packet records being ordered according to the order in which the packet traffic is transmitted by the data source; the interface element being further configured to segment the plurality of time stamped packet records into identified time periods, at least a first time stamped packet record being within a first time period having a first duration and a second time stamped packet record being within a second different time period having a second duration, and differences between successive packet timestamps being the same as they were at the data source;

wherein each of the first time period and the second time period have a first boundary that is coincident with a time stamp of a time stamped packet record, the time stamped packet record whose time stamp defines a first boundary of a respective first time period and second time period being a first time stamped packet record defined wholly within that time period; the volume of data carried by the plurality of time stamped packet records being identical to the volume of corresponding data originating from the data source;

a processor configured for each of the first time period and the second time period to:

compute a volume of data carried by the plurality of time stamped packet records defined wholly within that time period;

compute a lower bound on the source transmission rate by evaluating a ratio of the volume of data within a time duration defined for each of the first time period and the second time period, wherein the evaluating of a ratio of the volume of data within a time duration defined for each of the first time period and the second time period or each time period comprises identifying other time stamped packet records whose time stamps are within the first and second boundary, the first time stamped packet record and the other time stamped packet records defining a series of time stamped packet records within the time period, the volume of data carried by the plurality of time stamped packet records defined wholly within that time period is computed by analysing the series of time stamped packet records, identifying a last time stamped packet record within the series and disregarding any data carried by that identified last time stamped packet record when computing a sum of data carried by the series of time stamped packet records; and define a peak transmission rate as the greater of the first ratio and the second ratio.

* * * * *